(12) United States Patent
Overes

(10) Patent No.: US 8,189,125 B2
(45) Date of Patent: May 29, 2012

(54) APPARATUS FOR AUDIO, VIDEO AND/OR DATA RECORDING AND/OR REPRODUCING

(75) Inventor: Theodorus Franciscus Emilius Maria Overes, Eindhoven (NL)

(73) Assignee: Koninklijke Philips Electronics, N.V., Eindhoven (NL)

( * ) Notice: Subject to any disclaimer, the term of this patent is extended or adjusted under 35 U.S.C. 154(b) by 491 days.

(21) Appl. No.: 12/442,590

(22) PCT Filed: Sep. 19, 2007

(86) PCT No.: PCT/IB2007/053790
§ 371 (c)(1),
(2), (4) Date: Mar. 24, 2009

(87) PCT Pub. No.: WO2008/038190
PCT Pub. Date: Apr. 3, 2008

(65) Prior Publication Data
US 2009/0244409 A1  Oct. 1, 2009

(30) Foreign Application Priority Data

Sep. 26, 2006  (EP) .................................... 06121264

(51) Int. Cl.
*H04N 5/64* (2006.01)
(52) U.S. Cl. ......................... 348/836; 348/739
(58) Field of Classification Search ........... 348/836–843
See application file for complete search history.

(56) References Cited

U.S. PATENT DOCUMENTS

| 2,598,072 | A | * | 5/1952 | Rose .............................. 348/842 |
| 2,992,872 | A | * | 7/1961 | Bateman et al. ............... 312/7.2 |
| 6,809,295 | B1 | * | 10/2004 | Vargas .......................... 219/393 |
| 2005/0257435 | A1 | | 11/2005 | Rottcher |
| 2007/0272347 | A1 | * | 11/2007 | Coleman et al. .............. 156/230 |

FOREIGN PATENT DOCUMENTS

| JP | 2005229260 A1 | 8/2005 |
| JP | 2005323115 A1 | 11/2005 |
| WO | 03007598 A1 | 1/2003 |
| WO | 2005048784 A1 | 6/2005 |
| WO | 2005071646 A1 | 8/2005 |

OTHER PUBLICATIONS

Loewe "Nach alien Regeln Gegen die Regeln" Aug. 2005, Kronach, Germany.
Grundig "Attractive Design, Brilliant Pictures, Convenient Operation and HD Ready for the Future of television: the New LCD TVs from Grundig" Grundig Product Reports, Nov. 15, 2005, Nurnberg, Germany.
Samsung: "Samsung Releases Innovative LED LCD TV and Full HD LCD TVs" Samsung Press Release, Sep. 1, 2006.

* cited by examiner

*Primary Examiner* — Brian Glessner
*Assistant Examiner* — Adam Barlow

(57) ABSTRACT

An apparatus for audio, video and/or data recording and/or reproducing includes a cabinet. The cabinet is provided with a front and a side. In order to get the impression of a slim device the side is provided with an optically reflecting surface.

10 Claims, 4 Drawing Sheets

APPARATUS FOR AUDIO, VIDEO AND/OR DATA RECORDING AND/OR REPRODUCING

FIELD OF THE INVENTION

The invention relates to an apparatus for audio, video and/or data recording and/or reproducing, comprising a cabinet provided with a front and a side.

The invention further relates to a use of such an apparatus.

BACKGROUND OF THE INVENTION

The category of apparatus for audio, video and/or data recording and/or reproducing includes among others modem slim line display apparatus, such as flat TV-sets and flat multimedia monitors. Such modern products are provided with a display unit accommodated in a cabinet. The cabinet is provided with a front comprising a screen. A feature of the cabinet of nowadays display apparatus is the presence of rather slender flanks, i.e. side walls having a relatively small width, seen from the front of the cabinet to the back, compared to the flanks of the cabinets of conventional devices, such as cathode-ray-tube apparatus.

Generally, users of flat display apparatus wish to get the impression, when they look to the apparatus, that the apparatus is slim line. In practice, the issue is not the real depth of the apparatus, but the perceived depth. For this reason designers try to make the flanks of the cabinets as narrow as possible. However, decreasing the width of those flanks is generally limited by other requirements, such as the need to have sufficient space inside the cabinet, at both sides of the screen, for accommodating loudspeakers. It may be desired to provide the display products with integrated speaker systems for reproducing sound of high quality. Particularly for reproducing low frequency sound a certain minimum volume is required to make optimal use of the available power. A possible solution is to provide relatively broad front rims at both sides of the screen in combination with relatively narrow flanks, however such an approach is not generally appreciated, because it leads to an undesirably broad front. Another approach, viz. hiding flanks by giving them a color and texture corresponding to a background formed e.g. by a certain wall portion of a room, is not an option because there is not one standard background.

SUMMARY OF THE INVENTION

An object of the invention is to improve the apparatus as defined in the opening paragraph, particularly by providing a means for decreasing the perceived depth of the cabinet. The apparatus according to the invention comprises a cabinet provided with a front and a side, the side having an outwardly directed optically reflecting face. Due to the presence of this face, i.e. a surface capable of physically reflecting light, a person, being in an area extending before and/or sidewards with regard to the apparatus and looking at the apparatus, will see the background, having a certain color and texture, reflected by the optically reflecting face. This gives the impression that one is looking at the background, mostly a wall portion in front of which the apparatus is arranged, itself. In the looking person's perception the depth of the cabinet has disappeared, at least to a large extent, whereby the apparatus seems very flat and substantially floating with the background. A favorable consequence of this camouflaging effect is that the real depth of the cabinet can be optimized for technical requirements, such as the requirement relating to audio performance, without making the apparatus less attractive.

The measure taken by the inventor may be successfully applied into flat display apparatus. For this reason the invention particularly relates to a flat display apparatus comprising a cabinet provided with a front and a side, wherein the side has an optically reflecting outer face and wherein the cabinet accommodates a flat display unit having a display area extending in the front of the cabinet. The display apparatus according to the invention has similar benefits as described in the foregoing paragraphs.

In a preferred embodiment the optically reflecting face, is formed by a light-reflecting layer. The light-reflecting layer may be formed in a manner similar to making a mirror. A mirror has generally a reflecting pigment layer, which is formed by depositing a reflecting pigment on a transparent panel, such as a glass panel. The pigment may be e.g. a mixture of tin and amalgam. Alternatively, the light-reflective layer may be any coating having reflective properties. Chromium coatings or aluminum coatings e.g. are very suitable. These and other reflective layers may be formed by using technology steps known per se, such as sputtering, vapor depositing or electroplating.

In a practical embodiment the side has a sidewall, preferably two sidewalls, substantially covered by the optically reflecting face.

In another embodiment the side has a top wall and/or a bottom wall substantially covered by the optically reflecting face. In this embodiment the top wall and/or the bottom wall has reflective properties, whereby favorable effects can be obtained when the apparatus is located at a lower level, e.g. on or near a floor, and at a higher level, e.g. near a ceiling, respectively. In this embodiment the side may have one or more sidewalls.

In some designs it is preferred that one or each sidewall has an inwardly directed course with respect to and considered from the front of the cabinet. In other words in embodiments with two sidewalls, the sidewalls may taper from the front. The angle formed between an inwardly going sidewall and a plane perpendicular to the front can have, in principle, each value.

If desired, one or each sidewall may have an outwardly directed course with respect to and considered from the front of the cabinet. In this case there is some restriction regarding the angle formed between an outwardly going sidewall and a plane perpendicular to the front, in order to obtain the aimed effect.

In a preferred embodiment the optically reflecting face has an uneven texture. Such a texture provides an uneven surface for scattering light. Especially if the background surface has a repeating pattern, the scattering of light blurs this repeating pattern making it less obtrusive that the reflected pattern has a different repeating distance than the background pattern. Moreover, the reflected light still has the average color and intensity of the background surface and thus fulfills the requirements for obtaining the described object. An uneven reflective surface has further the advantage that it allows a lower specification regarding its planeness, which allows ordinary and thus cheaper reflecting layers. Furthermore, the effects of disturbing objects or light spots, if any, are reduced.

With reference to the Claims it is noted that all possible combinations of features mentioned in the Claims are part of the invention.

These and other aspects of the invention are apparent from and will be elucidated with reference to the examples described hereinafter.

DETAILED DESCRIPTION

Figure 1:
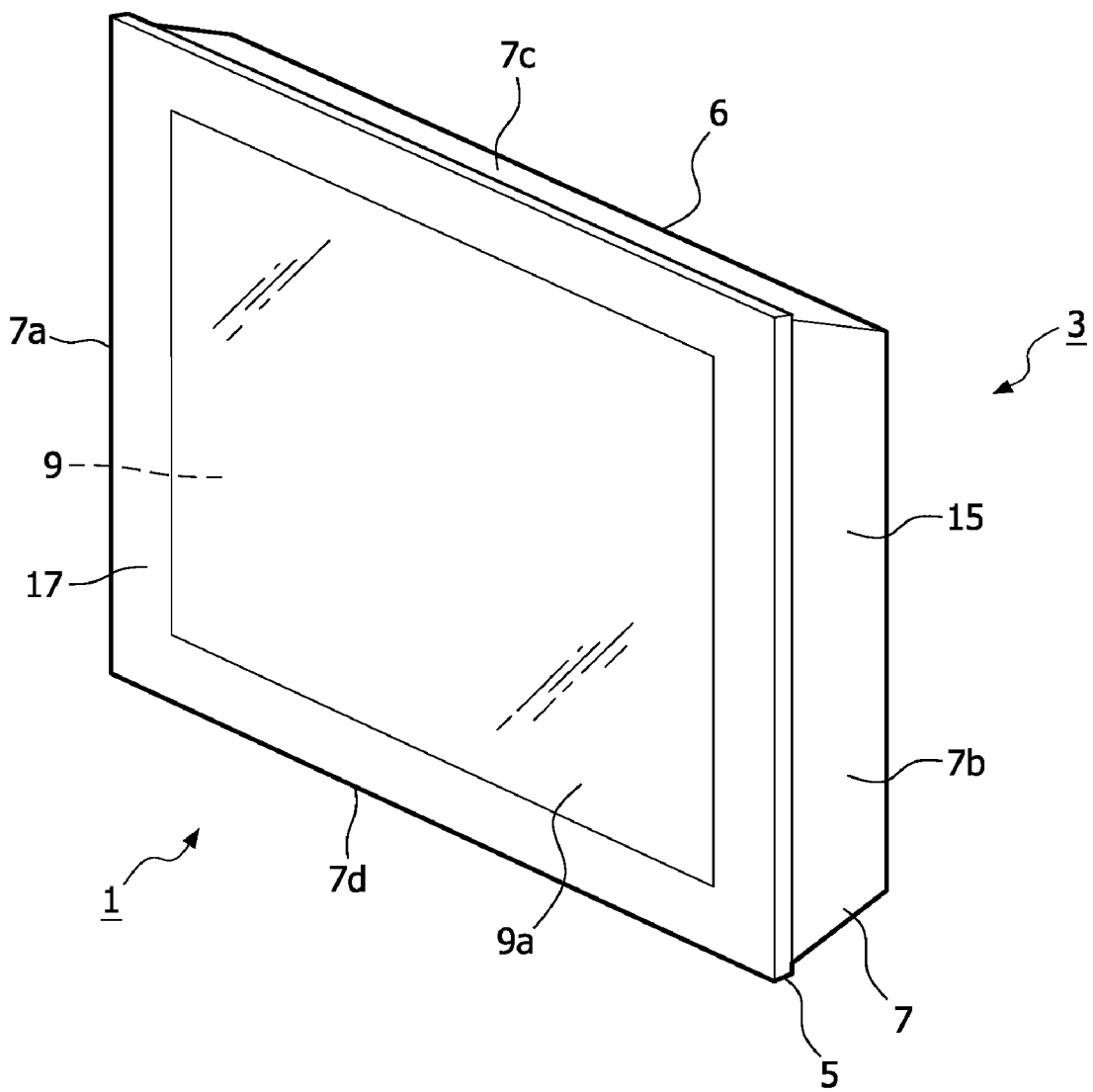
FIG. 1 schematically shows, in a perspective view, an embodiment of the apparatus according to the invention.
Figure 2:
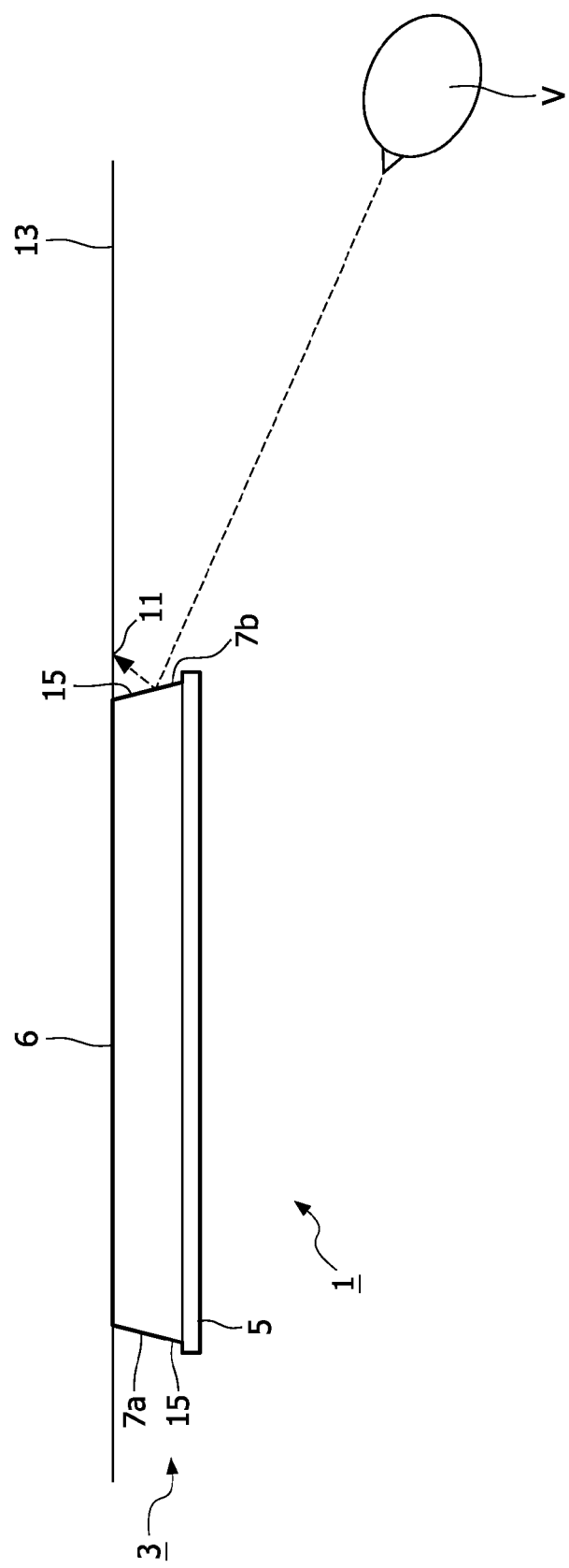
FIG. 2 schematically shows a top view of the embodiment of FIG. 1, secured to a background surface.
Figure 3:
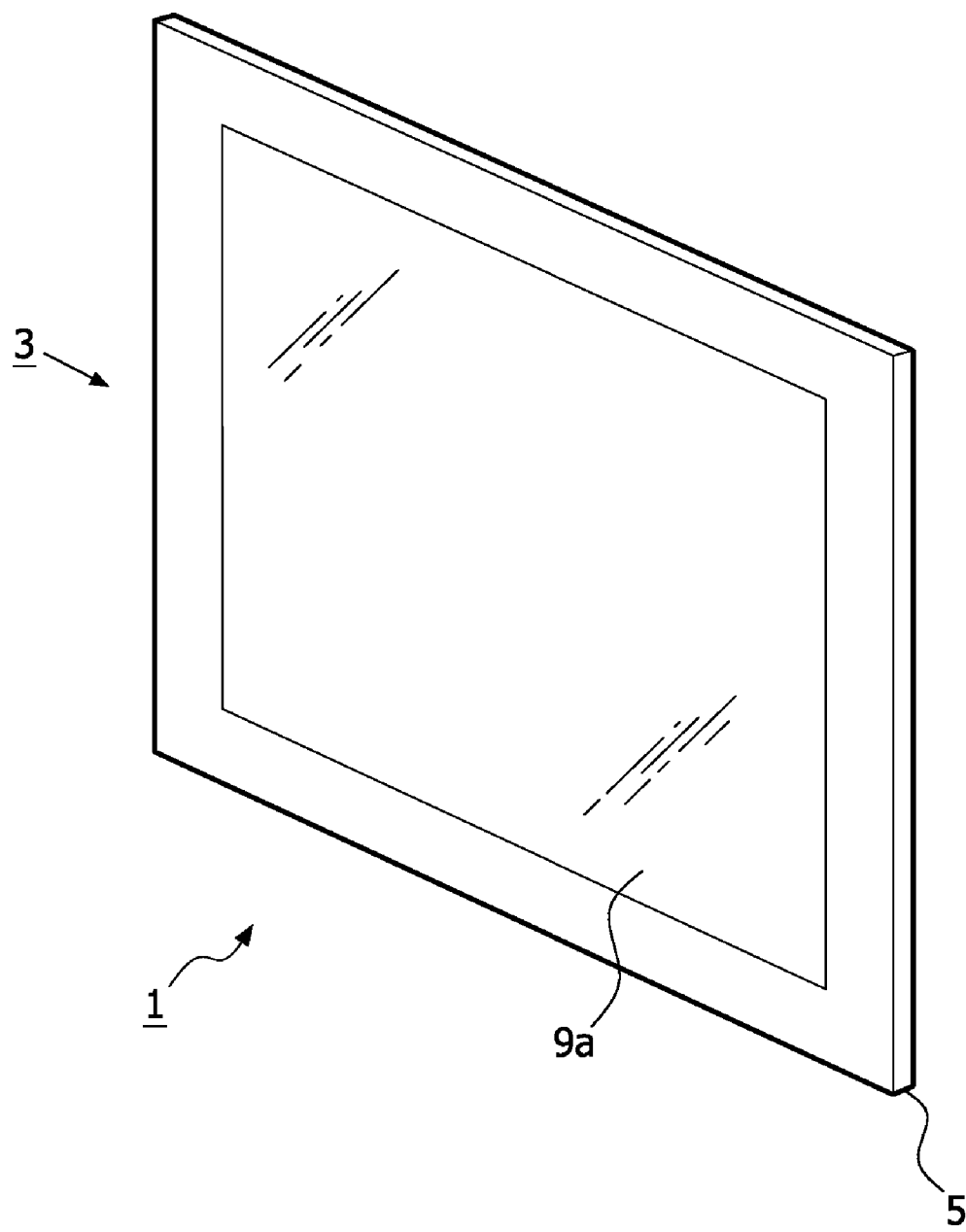
FIG. 3 schematically shows, in a perspective view, a visual effect of the embodiment of FIG. 1, secured to a background surface.

An embodiment of an apparatus according to the invention as disclosed in the FIGS. 1 to 3 is a slim line flat display apparatus 1, particularly a flat TV set. The apparatus 1 is provided with a cabinet 3 having a front 5, a rear 6 and a side 7. The side 7 includes two sidewalls 7a, 7b, a top wall 7c and a bottom wall 7d. The cabinet 3, which accommodates a flat display unit 9 with a display area 9a extending in the front 5, may be secured to a background surface 11, e.g. formed by a wall 13 of a room.

In the embodiment depicted in the FIGS. 1 to 3 the sidewalls 7a, 7b each have an optically reflecting face 15 directed outwardly seen from the cabinet 3. The presence of the reflecting face 15 has the effect that a viewer, who is indicated by the letter V in the drawing, looking from a position right or left in front of the cabinet 3 to one of the sidewalls 7a, 7b will not see the material of the sidewall itself, but the color and texture of the background surface 11 reflected in the reflecting face 15. The viewer V gets the impressing that he or she is looking at the background surface behind the apparatus 1, whereby the depth of the cabinet 3 has been virtually disappeared. In the viewer's impression, which has been schematically shown in FIG. 3, the apparatus 1 seems very thin, wherein the front 5 appears to float in front of the background surface 11. The invention enables a small rim 17 around the display area 9a in combination with a sufficient volume for building-in e.g. a high performance speaker system. If desired, the top wall 7c and/or the bottom wall 7d may be provided with the optical reflecting face 15. In the shown example the reflecting face 15 has been formed by conventional mirrors adhered to the sidewalls 7a, 7b. Such a mirror has a glass panel provided with a light-reflecting layer.

In the depicted embodiment the course of each sidewall 7a, 7b is inwardly directed with respect to and considered from the front 5 of the cabinet 3. In other words the sidewalls 7a, 7b taper from the front 5 towards the rear 6.

Figure 4:
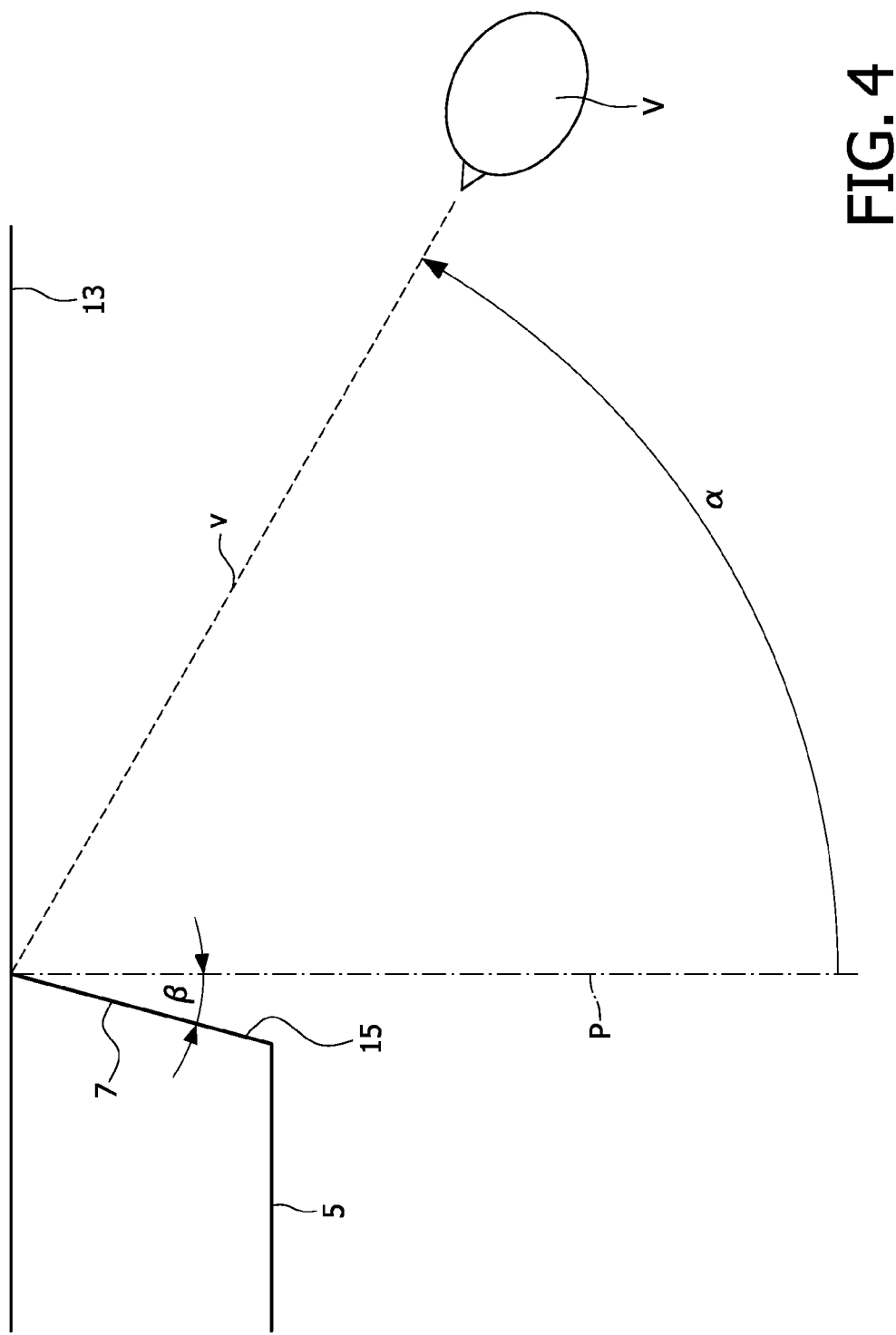
FIG. 4 schematically shows a relation between a structural aspect of an embodiment of the apparatus according to the invention and the position of a viewer.

In FIG. 4 an embodiment provided with a front 5 and a side 7 having a course directed outwardly with respect to and seen from the front 5 is schematically depicted. The side 7 comprises an optically reflecting face 15 having an even texture, i.e. being fully smooth. This embodiment is placed, during use, near or against a background surface 13. A viewer V wishes to have a viewing angle a as indicated in FIG. 4, the angle a being the angle between the direction of viewing v and a plane P oriented perpendicularly to the front 5. This angle may be at either side of the plane P. In order to guarantee the described desirable visual effect the reflecting face 15, or at least one or more portions thereof, should make an angle $\beta$ with the plane P oriented, which angle $\beta$ fulfills the requirement: $\beta \leq 45 - \frac{1}{2}\alpha$. If desired, the face 15 may have an uneven, particularly lightly uneven, texture.

In the foregoing it has been disclosed that an essential aspect of the invention is that at least a part of the side of a cabinet of an apparatus is provided with a wall having a wall surface directed towards a viewer, which wall surface has reflective properties and is shaped for reflecting a background to the viewer, in order to blur the depth of the apparatus.

While the invention has been illustrated and described in detail in the drawings and foregoing description, illustration and description are to be considered illustrative or exemplary and not restrictive. The invention is not limited to the disclosed embodiments. For example, it is possible to provide only one sidewall with the optically reflective surface if this is sufficient in certain applications. In the shown embodiments the sidewalls, top wall and bottom wall each have a simple rectangular shape. It is however possible to give one or more of these walls another shape, e.g. a more or less elliptical shape. Moreover the walls need not to be flat, but they may be curved. Other variations to the disclosed embodiment can be understood and effected by the skilled person in practicing the claimed invention, from a study of the drawings, the description and the claims. Apart from the disclosed flat TV set, the apparatus according to the invention may be a slim line embodiment of a CD player, a CD-ROM recorder, a DVD player, a DVD recorder, a tape recorder, a hard disc drive, a monitor, or any other video and/or audio and/or data recording an/or reproducing device. The apparatus may even be a loudspeaker box. In the Claims and the description the word "comprising" does not exclude other elements, and the indefinite article "a" or "an" does not exclude a plurality. Any reference sign in the Claims should not be construed as limiting the scope.

The invention claimed is:

1. An apparatus for audio, video and/or data recording and/or reproducing, comprising:
   a display area; and
   a cabinet provided with a front surface around the display area, a back surface and a side surface between the front surface and the back surface, wherein the back surface is closer to a wall than the front surface, and wherein the side surface has an optically reflecting face;
   wherein the front surface has a smaller perimeter than the back surface, and
   wherein the side surface is tapered outwardly from the front surface to the back surface.

2. The apparatus as claimed in claim 1, being a flat display apparatus, wherein the cabinet accommodates a flat display unit having the display area extending in the front portion of the cabinet.

3. The apparatus as claimed in claim 1, wherein the optically reflecting face is formed by a light-reflecting layer.

4. The apparatus as claimed in claim 1, wherein the side has a sidewall substantially covered by the optically reflecting face.

5. The apparatus as claimed in claim 4, wherein the side has a further sidewall substantially covered by the optically reflecting face, wherein the front portion of the cabinet substantially extends between both sidewalls.

6. The apparatus as claimed in claim 1, wherein the side has a top wall substantially covered by the optically reflecting face.

7. The apparatus as claimed in claim 4, wherein the side has a bottom wall substantially covered by the optically reflecting face.

8. The apparatus as claimed in claim 1, wherein the optically reflecting face has an uneven texture.

9. The apparatus of claim 1, wherein an angle $\beta$ between the back portion and a plane P oriented perpendicularly to the back portion satisfies a relationship of $\beta \leq 45 - \frac{1}{2}\alpha$, wherein $\alpha$ is a viewing angle between the plane P and a direction of viewing between a viewer and the back portion.

10. An apparatus for audio, video and/or data recording and/or reproducing, comprising:

a display area; and a cabinet provided with a front portion around the display area, a back portion and a side between the front portion and the back portion, wherein the back portion is closer to a background surface than the front portion, and wherein the side has an inwardly directed optically reflecting face when viewed from the front portion so that back portion is smaller than the front portion.

\* \* \* \* \*